(12) United States Patent
Hanan

(10) Patent No.: US 11,827,410 B2
(45) Date of Patent: *Nov. 28, 2023

(54) PREFORM EXTENDED FINISH FOR PROCESSING LIGHT WEIGHT ECOLOGICALLY BENEFICIAL BOTTLES

(71) Applicant: Niagara Bottling, LLC, Diamond Bar, CA (US)

(72) Inventor: Jay Clarke Hanan, Ontario (CA)

(73) Assignee: Niagara Bottling, LLC, Diamond Bar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/590,705

(22) Filed: Jan. 6, 2015

(65) Prior Publication Data

US 2015/0122766 A1 May 7, 2015

Related U.S. Application Data

(63) Continuation of application No. 13/295,699, filed on Nov. 14, 2011, now Pat. No. 8,956,707.

(Continued)

(51) Int. Cl.
*B65D 1/02* (2006.01)
*B29C 49/00* (2006.01)
(Continued)

(52) U.S. Cl.
CPC ............ *B65D 1/0215* (2013.01); *B29B 11/14* (2013.01); *B29C 49/071* (2022.05); *B65D 1/023* (2013.01);
(Continued)

(58) Field of Classification Search
CPC ..... B29B 11/14; B29C 49/00; B29C 49/0005; B29C 49/02; B65D 1/0207; B65D 1/0223;
(Continued)

(56) References Cited

U.S. PATENT DOCUMENTS

D63,015 S 3/1867 Carlton
3,029,963 A 4/1962 Evers
(Continued)

FOREIGN PATENT DOCUMENTS

CN 1473102 A 2/2004
EP 0199576 A2 10/1986
(Continued)

OTHER PUBLICATIONS

International Search Report and Written Opinion for PCT/US2011/060587 dated Mar. 14, 2012 in 12 pages.
(Continued)

*Primary Examiner* — Michael C Miggins
(74) *Attorney, Agent, or Firm* — Michael Best & Friedrich LLP

(57) ABSTRACT

A plastic preform apparatus is disclosed that is suitable for forming a bottle. The plastic preform apparatus features a neck portion adapted to engage a closure and includes a support ring at its lowermost point. The neck portion features a first wall thickness, and an elongated body portion including a cylindrical wall portion and an end cap. An upper segment of the body portion adjacent to the support ring features a second wall thickness substantially similar to the first wall thickness and less than a third wall thickness in a lower segment of the body portion.

7 Claims, 7 Drawing Sheets

Related U.S. Application Data

(60) Provisional application No. 61/413,167, filed on Nov. 12, 2010.

(51) Int. Cl.

| | |
|---|---|
| *B29B 11/14* | (2006.01) |
| *B29B 11/08* | (2006.01) |
| *B29K 23/00* | (2006.01) |
| *B29K 25/00* | (2006.01) |
| *B29K 27/06* | (2006.01) |
| *B29K 27/00* | (2006.01) |
| *B29K 27/18* | (2006.01) |
| *B29K 55/02* | (2006.01) |
| *B29K 67/00* | (2006.01) |
| *B29K 69/00* | (2006.01) |
| *B29K 77/00* | (2006.01) |
| *B29K 81/00* | (2006.01) |
| *B29L 31/00* | (2006.01) |
| *B29K 101/12* | (2006.01) |

(52) U.S. Cl.
CPC .......... *B29B 11/08* (2013.01); *B29C 2949/072* (2022.05); *B29C 2949/073* (2022.05); *B29C 2949/078* (2022.05); *B29C 2949/0773* (2022.05); *B29C 2949/0777* (2022.05); *B29C 2949/0779* (2022.05); *B29C 2949/0817* (2022.05); *B29C 2949/0831* (2022.05); *B29C 2949/0872* (2022.05); *B29C 2949/22* (2022.05); *B29C 2949/24* (2022.05); *B29C 2949/26* (2022.05); *B29C 2949/28* (2022.05); *B29C 2949/3024* (2022.05); *B29C 2949/3032* (2022.05); *B29K 2023/06* (2013.01); *B29K 2023/0625* (2013.01); *B29K 2023/083* (2013.01); *B29K 2023/086* (2013.01); *B29K 2023/12* (2013.01); *B29K 2025/00* (2013.01); *B29K 2027/06* (2013.01); *B29K 2027/08* (2013.01); *B29K 2027/18* (2013.01); *B29K 2055/02* (2013.01); *B29K 2067/00* (2013.01); *B29K 2067/006* (2013.01); *B29K 2069/00* (2013.01); *B29K 2077/00* (2013.01); *B29K 2081/06* (2013.01); *B29K 2101/12* (2013.01); *B29L 2031/7158* (2013.01); *Y10T 428/1352* (2015.01); *Y10T 428/1379* (2015.01); *Y10T 428/1397* (2015.01)

(58) Field of Classification Search
CPC ..... B65D 1/023; B65D 1/02; Y10T 428/1352; Y10T 428/1379; Y10T 428/1397; B32B 1/02

See application file for complete search history.

(56) References Cited

U.S. PATENT DOCUMENTS

| | | | |
|---|---|---|---|
| 3,438,578 A | 4/1969 | Moyer et al. | |
| D252,530 S | 7/1979 | Budish | |
| 4,316,551 A | 2/1982 | Belokin, Jr. | |
| 4,374,878 A * | 2/1983 | Jakobsen | B29C 49/0073 264/310 |
| D294,462 S | 3/1988 | Ota et al. | |
| 4,756,439 A | 7/1988 | Perock | |
| 4,818,213 A | 4/1989 | Roy | |
| 4,818,575 A | 4/1989 | Hirata et al. | |
| 4,847,129 A * | 7/1989 | Collette | B29C 45/1643 215/12.2 |
| 4,863,046 A | 9/1989 | Collette et al. | |
| 4,907,709 A | 3/1990 | Abe et al. | |
| 4,927,680 A | 5/1990 | Collette et al. | |
| 4,948,001 A | 8/1990 | Magly | |
| D315,869 S | 4/1991 | Collette | |
| D321,830 S | 11/1991 | York et al. | |
| 5,067,622 A | 11/1991 | Garver et al. | |
| 5,092,475 A | 3/1992 | Krishnamumar et al. | |
| 5,133,468 A | 7/1992 | Brunson et al. | |
| 5,178,289 A | 1/1993 | Krishnamkumar et al. | |
| 5,199,588 A | 4/1993 | Hayashi | |
| 5,255,889 A | 10/1993 | Collette et al. | |
| 5,279,433 A | 1/1994 | Krishnakumar et al. | |
| 5,281,387 A | 1/1994 | Collette et al. | |
| D345,693 S | 4/1994 | Edstrom | |
| 5,303,833 A | 4/1994 | Hayashi et al. | |
| 5,303,834 A | 4/1994 | Krishnakumar et al. | |
| 5,337,909 A | 8/1994 | Vailliencourt | |
| 5,341,946 A | 8/1994 | Vailliencourt et al. | |
| D352,238 S | 11/1994 | Vailliencourt et al. | |
| D352,245 S | 11/1994 | Krishnakumar et al. | |
| 5,366,774 A | 11/1994 | Pinto et al. | |
| 5,381,910 A | 1/1995 | Sigiura et al. | |
| 5,407,086 A | 4/1995 | Ota et al. | |
| D358,766 S | 5/1995 | Vailliencourt et al. | |
| 5,411,699 A | 5/1995 | Collette et al. | |
| D364,565 S | 11/1995 | Vailliencourt et al. | |
| D366,416 S | 1/1996 | Semersky | |
| D366,417 S | 1/1996 | Semersky | |
| 5,632,397 A | 5/1997 | Fandeux et al. | |
| 5,645,183 A | 7/1997 | Slat et al. | |
| 5,669,520 A | 9/1997 | Simpson | |
| 5,704,503 A | 1/1998 | Krishnakumar et al. | |
| D391,168 S | 2/1998 | Ogg | |
| D393,802 S | 4/1998 | Collette et al. | |
| 5,762,221 A | 6/1998 | Tobias et al. | |
| D397,614 S | 9/1998 | Krishnakumar et al. | |
| D402,895 S | 12/1998 | Takahashi et al. | |
| D404,308 S | 1/1999 | Takahashi et al. | |
| 5,888,598 A | 3/1999 | Brewster et al. | |
| D407,649 S | 4/1999 | McCallister et al. | |
| D407,650 S | 4/1999 | Takahashi et al. | |
| D411,453 S | 6/1999 | Piccioli et al. | |
| 5,908,128 A | 6/1999 | Krishnakumar et al. | |
| D413,519 S | 9/1999 | Eberle et al. | |
| 5,971,184 A | 10/1999 | Krishnakumar et al. | |
| 5,988,417 A | 11/1999 | Cheng et al. | |
| 6,016,932 A | 1/2000 | Gaydosh et al. | |
| D419,882 S | 2/2000 | Bretz et al. | |
| D420,592 S | 2/2000 | Bretz et al. | |
| 6,036,037 A | 3/2000 | Scheffer et al. | |
| D423,365 S | 4/2000 | Eberle | |
| 6,044,996 A | 4/2000 | Carew et al. | |
| 6,044,997 A | 4/2000 | Ogg | |
| 6,062,409 A | 5/2000 | Eberle | |
| D426,460 S | 6/2000 | Krishnakumar et al. | |
| D427,905 S | 7/2000 | Eberle | |
| 6,092,688 A | 7/2000 | Eberle | |
| D429,647 S | 8/2000 | Warner et al. | |
| D430,493 S | 9/2000 | Weick | |
| 6,112,925 A | 9/2000 | Nahill et al. | |
| D434,330 S | 11/2000 | Rowe et al. | |
| D440,157 S | 4/2001 | Lichtman et al. | |
| D440,158 S | 4/2001 | Bretz et al. | |
| D440,877 S | 4/2001 | Lichtman et al. | |
| D441,294 S | 5/2001 | Lichtman et al. | |
| 6,230,912 B1 | 5/2001 | Rashid | |
| 6,248,413 B1 | 6/2001 | Barel et al. | |
| D445,033 S | 7/2001 | Bretz et al. | |
| 6,257,433 B1 | 7/2001 | Ogg et al. | |
| D446,126 S | 8/2001 | Bretz et al. | |
| D447,411 S | 9/2001 | Lichtman et al. | |
| 6,296,131 B2 | 10/2001 | Rashid | |
| 6,347,717 B1 | 2/2002 | Eberle | |
| D454,500 S | 3/2002 | Bretz et al. | |
| D465,158 S | 11/2002 | Peek et al. | |
| D466,021 S | 11/2002 | Thierjung | |
| D466,819 S | 12/2002 | Darr et al. | |
| 6,494,333 B2 | 12/2002 | Sasaki et al. | |
| D469,358 S | 1/2003 | Bryant et al. | |
| D469,359 S | 1/2003 | Bryant et al. | |
| D469,695 S | 2/2003 | Bryant et al. | |
| D469,696 S | 2/2003 | Bryant et al. | |

(56) References Cited

U.S. PATENT DOCUMENTS

| | | |
|---|---|---|
| D470,773 S | 2/2003 | Darr et al. |
| D472,470 S | 4/2003 | Bretz et al. |
| 6,554,146 B1 | 4/2003 | DeGroff et al. |
| D476,236 S | 6/2003 | Ungrady et al. |
| 6,585,125 B1 | 7/2003 | Peek |
| D479,690 S | 9/2003 | DeGroff |
| 6,616,001 B2 | 9/2003 | Saito et al. |
| D480,957 S | 10/2003 | Mooney et al. |
| D485,765 S | 1/2004 | Thieriung et al. |
| 6,682,794 B1 | 1/2004 | Horn et al. |
| 6,722,514 B2 | 4/2004 | Renz |
| 6,739,467 B2 | 5/2004 | Saito et al. |
| D494,475 S | 8/2004 | Thierjung et al. |
| D497,551 S | 10/2004 | Gamel et al. |
| 6,830,158 B2 | 12/2004 | Yourist |
| 6,841,262 B1 | 1/2005 | Beck et al. |
| D502,108 S | 2/2005 | Gamel et al. |
| D503,625 S | 4/2005 | Nelson et al. |
| D503,885 S | 4/2005 | Bretz et al. |
| D504,063 S | 4/2005 | Bretz et al. |
| D506,675 S | 6/2005 | Bretz et al. |
| D506,676 S | 6/2005 | Bretz et al. |
| D506,677 S | 6/2005 | Bretz et al. |
| D507,491 S | 7/2005 | Bretz et al. |
| D507,609 S | 7/2005 | Bretz et al. |
| D507,749 S | 7/2005 | Bretz et al. |
| D508,857 S | 8/2005 | Bretz et al. |
| 6,932,230 B2 | 8/2005 | Pedmo et al. |
| D510,526 S | 10/2005 | Bretz et al. |
| 7,025,219 B2 | 4/2006 | Heisner et al. |
| 7,032,770 B2 | 4/2006 | Finlay et al. |
| 7,033,656 B2 | 4/2006 | Nahil et al. |
| D525,530 S | 7/2006 | Livingston et al. |
| D527,643 S | 9/2006 | Gottlieb |
| 7,172,087 B1 | 2/2007 | Axe et al. |
| D538,660 S | 3/2007 | Gatewood |
| 7,198,164 B2 | 4/2007 | Yourist et al. |
| D548,106 S | 8/2007 | Martinez et al. |
| 7,258,244 B2 | 8/2007 | Ungrady |
| D551,081 S | 9/2007 | Ohara et al. |
| 7,267,242 B2 | 9/2007 | Tanaka et al. |
| D555,499 S | 11/2007 | Ross |
| 7,334,695 B2 | 2/2008 | Bysick et al. |
| 7,334,696 B2 | 2/2008 | Tanaka et al. |
| 7,347,339 B2 | 3/2008 | Bangi et al. |
| 7,364,046 B2 | 4/2008 | Joshi et al. |
| 7,416,089 B2 | 8/2008 | Kraft et al. |
| 7,416,090 B2 | 8/2008 | Mooney et al. |
| D579,339 S | 10/2008 | Shmagin |
| 7,451,886 B2 | 11/2008 | Lisch et al. |
| D584,627 S | 1/2009 | Lepoitevin |
| D598,779 S | 8/2009 | Lepoitevin |
| D610,015 S | 2/2010 | Yourist et al. |
| 7,694,842 B2 | 4/2010 | Melrose |
| 7,699,183 B2 | 4/2010 | Matsuoka et al. |
| 7,748,551 B2 | 7/2010 | Gatewood et al. |
| 7,748,552 B2 | 7/2010 | Livingston et al. |
| 7,757,874 B2 | 7/2010 | Ross |
| D621,271 S | 8/2010 | Soni |
| 7,780,025 B2 | 8/2010 | Simpson, Jr. et al. |
| D623,529 S | 9/2010 | Yourist et al. |
| D624,427 S | 9/2010 | Yourist et al. |
| 7,798,349 B2 | 9/2010 | Maczek et al. |
| D630,515 S | 1/2011 | Bretz et al. |
| 7,861,876 B2 | 1/2011 | Stowitts |
| 7,927,678 B2 * | 4/2011 | Mitadera ............. B32B 1/02 428/35.7 |
| 7,980,404 B2 | 7/2011 | Trude et al. |
| 8,020,717 B2 | 9/2011 | Patel |
| 8,047,388 B2 | 11/2011 | Kelley et al. |
| 8,091,720 B2 | 1/2012 | Colloud |
| 8,308,007 B2 | 11/2012 | Mast et al. |
| 8,328,033 B2 | 12/2012 | Mast |
| 8,381,496 B2 | 2/2013 | Trude et al. |
| 8,728,601 B2 | 5/2014 | Hutts et al. |
| 8,956,707 B2 * | 2/2015 | Hanan ............. B65D 1/023 428/36.6 |
| 10,118,724 B2 | 11/2018 | Hanan |
| 10,329,043 B2 | 6/2019 | Hanan |
| 10,647,465 B2 | 5/2020 | Hanan |
| 10,829,260 B2 | 11/2020 | Hanan |
| 2001/0030166 A1 | 10/2001 | Ozawa et al. |
| 2004/0000533 A1 | 1/2004 | Kamineni et al. |
| 2005/0279728 A1 | 12/2005 | Finlay et al. |
| 2006/0065992 A1 * | 3/2006 | Hutchinson ............ B29C 44/12 264/320 |
| 2006/0070977 A1 | 4/2006 | Howell et al. |
| 2006/0113274 A1 | 6/2006 | Keller et al. |
| 2006/0131257 A1 | 6/2006 | Gatewood et al. |
| 2006/0157439 A1 | 7/2006 | Howell |
| 2006/0255235 A1 | 11/2006 | Meyer et al. |
| 2007/0131644 A1 | 6/2007 | Melrose |
| 2007/0210026 A1 | 9/2007 | Darr et al. |
| 2008/0087628 A1 | 4/2008 | Bangi et al. |
| 2008/0257855 A1 | 10/2008 | Patel |
| 2009/0020497 A1 | 1/2009 | Tanaka et al. |
| 2009/0065468 A1 | 3/2009 | Hata et al. |
| 2009/0159556 A1 | 6/2009 | Patcheak et al. |
| 2009/0166314 A1 | 7/2009 | Matsouka |
| 2009/0184127 A1 | 7/2009 | Mooney |
| 2009/0188888 A1 | 7/2009 | Penny |
| 2009/0261058 A1 | 10/2009 | Pritchett, Jr. |
| 2009/0261059 A1 | 10/2009 | Pritchett, Jr. |
| 2009/0266785 A1 | 10/2009 | Siegl |
| 2009/0283495 A1 | 11/2009 | Lane et al. |
| 2009/0321383 A1 | 12/2009 | Lane |
| 2010/0028577 A1 | 2/2010 | Siegl |
| 2010/0089865 A1 | 4/2010 | Oguchi et al. |
| 2010/0163513 A1 | 7/2010 | Pedmo |
| 2010/0176081 A1 | 7/2010 | Kamineni et al. |
| 2010/0206838 A1 | 8/2010 | Mast et al. |
| 2010/0206839 A1 | 8/2010 | Tanaka et al. |
| 2010/0206892 A1 | 8/2010 | Mast |
| 2010/0213204 A1 | 8/2010 | Melrose |
| 2010/0286837 A1 | 8/2010 | Deemer et al. |
| 2010/0023378 A1 | 9/2010 | Ratnam |
| 2010/0270259 A1 | 10/2010 | Russell et al. |
| 2010/0304168 A1 * | 12/2010 | Dornbach ............ B29B 11/14 428/542.8 |
| 2010/0304169 A1 | 12/2010 | Dornbach |
| 2010/0314348 A1 | 12/2010 | Zoppas et al. |
| 2010/0320218 A1 | 12/2010 | Tanaka |
| 2011/0008560 A1 * | 1/2011 | Dabbous ............ C08K 5/0091 428/36.9 |
| 2011/0017700 A1 | 1/2011 | Patcheak et al. |
| 2011/0073559 A1 | 3/2011 | Schlies et al. |
| 2011/0115135 A1 | 5/2011 | Siegl |
| 2012/0027966 A1 | 2/2012 | Barel et al. |
| 2012/0031870 A1 | 2/2012 | Porter et al. |
| 2012/0231191 A1 | 9/2012 | Siegl |
| 2012/0248003 A1 | 10/2012 | Hunter et al. |
| 2012/0263902 A1 | 10/2012 | Hanan |
| 2014/0190927 A1 | 7/2014 | Lane |
| 2014/0346135 A1 | 11/2014 | Melrose |
| 2015/0144587 A1 | 5/2015 | Hanan |
| 2016/0176566 A1 | 6/2016 | Hanan |
| 2016/0193750 A1 | 7/2016 | Gaiotti et al. |
| 2016/0257029 A1 | 9/2016 | Lane et al. |

FOREIGN PATENT DOCUMENTS

| | | |
|---|---|---|
| EP | 2325091 A1 | 5/2011 |
| FR | 2 846 946 | 5/2004 |
| FR | 2899204 | 10/2007 |
| JP | S62164504 A | 7/1987 |
| JP | 7 164436 | 6/1995 |
| JP | 09240647 | 9/1997 |
| JP | 10029614 | 2/1998 |
| JP | 2004 090425 | 3/2004 |
| JP | 2008 189721 | 8/2008 |
| JP | 2009 045877 | 3/2009 |
| JP | 2013510015 A | 3/2013 |
| JP | 2015182789 A | 10/2015 |

(56) References Cited

FOREIGN PATENT DOCUMENTS

| | | |
|---|---|---|
| JP | H0848321 A | 10/2015 |
| KR | 20040050926 A | 6/2004 |
| WO | WO 2004/080828 | 9/2004 |
| WO | WO 2006/005413 | 1/2006 |
| WO | WO 2006/027092 | 3/2006 |
| WO | WO 2007/033722 | 3/2007 |
| WO | WO 2007/124894 | 11/2007 |
| WO | WO 2011/160748 | 12/2011 |
| WO | WO 2012/095285 | 7/2012 |
| WO | WO 2012/156048 | 11/2012 |
| WO | WO2017035267 A1 | 3/2017 |
| WO | WO2017136584 A1 | 8/2017 |

OTHER PUBLICATIONS

International Search Report and Written Opinion for PCT application No. PCT/US2012/067795 dated Mar. 13, 2013, by Detlef Meyer.

International Search Report with Written Opinion for related Application No. PCT/US2017/016269 dated Apr. 17, 2017 (6 Pages).

International Search Report with Written Opinion for related Application No. PCT/US2019/040586 dated Nov. 6, 2019 (11 Pages).

Examiner's Decision of Rejections from theJapanese Patent Office for related Application No. 2018-559683 dated Jan. 5, 2021 (4 Pages including the Statement of Relevance).

Office Action issued from the Indonesia patent Office for related Application N. P00201805779 dated Jan. 22, 2021 ( 3 Pages including the Statement of Relevance).

Office action issued from the European Patent Office for related Application No. 18190142.2 dated Jan. 27, 2021 (3 Pages).

Re-Examination Notification issued from the Chinese Patent Office for related Application No. 201710052177.X dated Feb. 22, 2021 (13 Pages including English Translation).

Second Office Action issued from the Chinese Patent Office for related Application No. 201810939013.3 dated Jan. 12, 2021 (11 Pages including English Translation).

Second Examination Report issued from the Australina Patent Office for related Application No. 2019232807 dated Feb. 4, 2021 (4 Pages).

An-Sofie Schoonjans et al, "Cardiovascular safety of low-dose fenfluramine in Dravet syndrome: a review of its benefit-risk profile in a new patient population", Current Medical Research and Opinion, vol. 33, No. 10, Jul. 31, 2017, pp. 1773-1781.

An-Sofie Schoonjans, "Low-dose fenfluramine in the treatment of neurologic disorders: experience in Dravet syndrome", Jan. 1, 2015 pp. 328-338,.

Jake Remaly, "Fenfluramine Reduces Convulsive Seizure Frequency in Dravet Syndrome | Epilepsy Resource Center", Jan. 1, 2018 https://www.mdedge.com/neurology/epilepsyresourcecenter/article/153865/epilepsy-seizures/fenfluramine-reduces.

Brenot et al, "Primary pulmonary hypertension and fenfluramine use.", Heart, vol. 70, No. 6, Dec. 1, 1993 (Dec. 1, 1993), p. 537-541.

Office action issued from the European Patent Office for related Application No. 21173419-9 dated Jul. 30, 2021 (11 Pages).

Examination Report issued from the Australian Patent Office for related Application No. 2017213829 dated Nov. 16, 2021 (5 Pages).

\* cited by examiner

PREFORM EXTENDED FINISH FOR PROCESSING LIGHT WEIGHT ECOLOGICALLY BENEFICIAL BOTTLES

RELATED APPLICATION INFORMATION

This application claims priority under 35 U.S.C. § 119(e) to U.S. patent application Ser. No. 13/295,699, filed on Nov. 14, 2011 and U.S. Provisional Application Ser. No. 61/413,167, filed on Nov. 12, 2010, which is hereby incorporated by reference in its entirety.

FIELD OF THE INVENTION

This invention relates to plastic bottles and preforms, more specifically plastic performs and bottles blown from such preforms that are suitable for containing beverages and utilize less resin such that they are lighter in weight than conventional bottles.

BACKGROUND OF THE INVENTION

Plastic containers have been used as a replacement for glass or metal containers in the packaging of beverages for several decades. The most common plastic used in making beverage containers today is PET. Containers made of PET are transparent, thin-walled, and have the ability to maintain their shape by withstanding the force exerted on the walls of the container by their contents. PET resins are also reasonably priced and easy to process. PET bottles are generally made by a process that includes the blow-molding of plastic preforms which have been made by injection molding of the PET resin.

Advantages of plastic packaging include lighter weight and decreased breakage as compared to glass, and lower costs overall when taking both production and transportation into account. Although plastic packaging is lighter in weight than glass, there is still great interest in creating the lightest possible plastic packaging so as to maximize the cost savings in both transportation and manufacturing by making and using containers that contain less plastic.

SUMMARY OF THE INVENTION

A new approach which relies on a general change in preform design has been invented, which significantly improves the ability to blow efficient, lightweight bottles. The design elegantly incorporates features for protecting critical dimensions of the bottle and stabilizing the production blowing process. These features may also utilize less resin while achieving suitable mechanical performance resulting in a reduction in the use of petroleum products by the industry.

In accordance with embodiments disclosed herein, there is provided a plastic preform suitable for forming a bottle, and a bottle or container made from such a preform. The preform comprises a neck portion adapted to engage a closure and including a support ring at its lowermost point, the neck portion having a first wall thickness, and an elongated body portion including a generally cylindrical wall portion and an end cap. In some embodiments, the upper segment of the body portion adjacent to the support ring has a second wall thickness substantially similar to the first wall thickness and less than a third wall thickness in a lower segment of the body portion. Further embodiments may include one or more of the following features: the second wall thickness is about 25% to about 40% of the third wall thickness; the second wall thickness is about 25% to about 30% of the third wall thickness; the second wall thickness is about 0.7 mm to about 0.8 mm; an axial length of the upper segment is about 25% or more of an axial length of the neck portion; and/or an axial length of the upper segment is about 25% to about 35% of an axial length of the neck portion. In other embodiments, the second wall thickness is thicker or thinner than the first wall thickness by 0.1 mm, 0.2 mm, 0.3 mm, or 0.4 mm. Containers or bottles made from such preforms are also disclosed herein.

In accordance with embodiments disclosed herein, there is provided a plastic preform, comprising a neck portion often including a support ring, wherein the neck portion has a first wall thickness, and a body portion including an elongated cylindrical wall having upper, middle and lower segments, wherein the middle segment has a second wall thickness and the lower segment of the body portion includes an end cap. In some embodiments, the upper segment of the body portion has a wall thickness substantially similar to the first wall thickness and less than the second wall thickness and/or the axial length of the upper segment is about 25% or more of the axial length of the neck portion. Further embodiments may include one or more of the following features: the upper segment wall thickness is about 25% to about 40% of the second wall thickness; the upper segment wall thickness is about 25% to about 30% of the second wall thickness; the upper segment wall thickness is about 0.7 mm to about 0.8 mm; and/or an axial length of the upper segment is about 25% to about 35% of an axial length of the neck portion. In other embodiments, the upper segment wall thickness is thicker or thinner than the first wall thickness by 0.1 mm, 0.2 mm, 0.3 mm, or 0.4 mm. Containers or bottles made from such preforms are also disclosed herein.

DETAILED DESCRIPTION OF THE PREFERRED EMBODIMENT

Disclosed herein are articles, including preforms and containers, which utilize less plastic in their construction while maintaining the ease of processing and excellent structural properties associated with current commercial designs.

Figure 1:
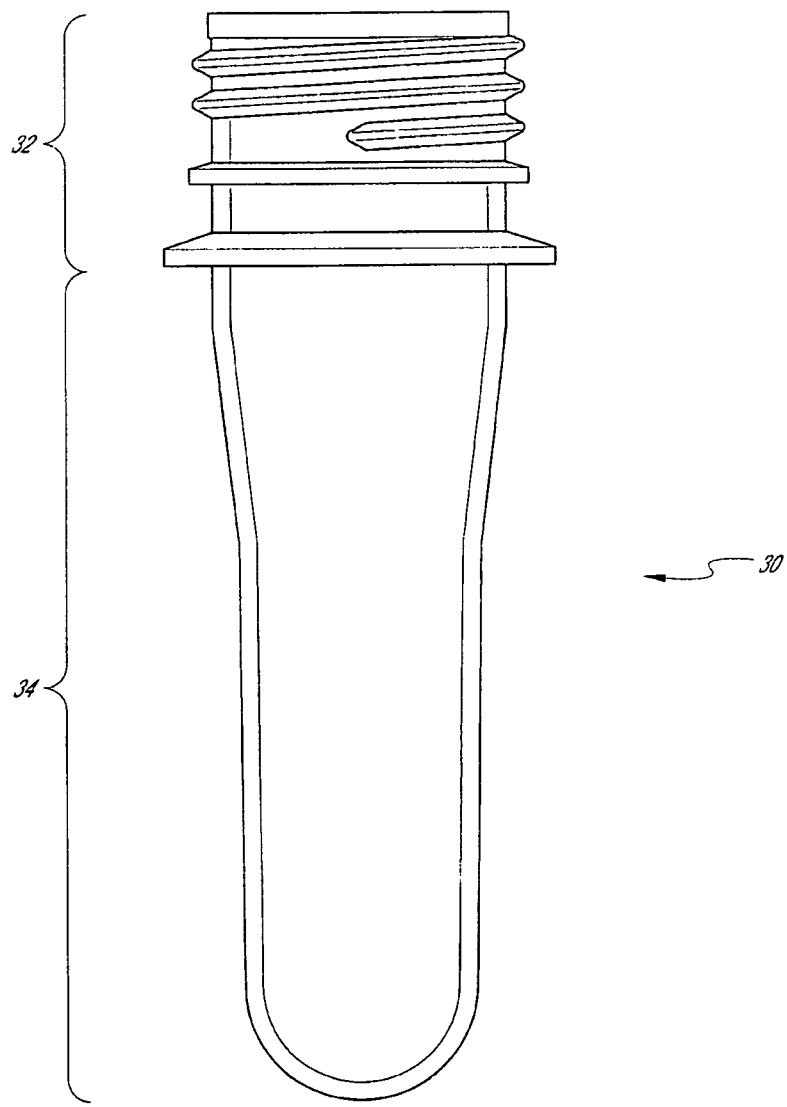
FIG. 1 is a preform suitable for being blow molded to form a bottle.

Referring to FIG. 1, a preform 30 is depicted. The preform is preferably made of material approved for contact with food and beverages such as virgin PET and can be of any of a wide variety of shapes and sizes. The preform shown in FIG. 1 is of the type which will form a 12-16 oz. beverage bottle, but as will be understood by those skilled in the art, other preform configurations can be used depending upon the desired configuration, characteristics and use of the final article. The preform 30 may be made by injection molding methods including those that are well known in the art.

Figure 2A:
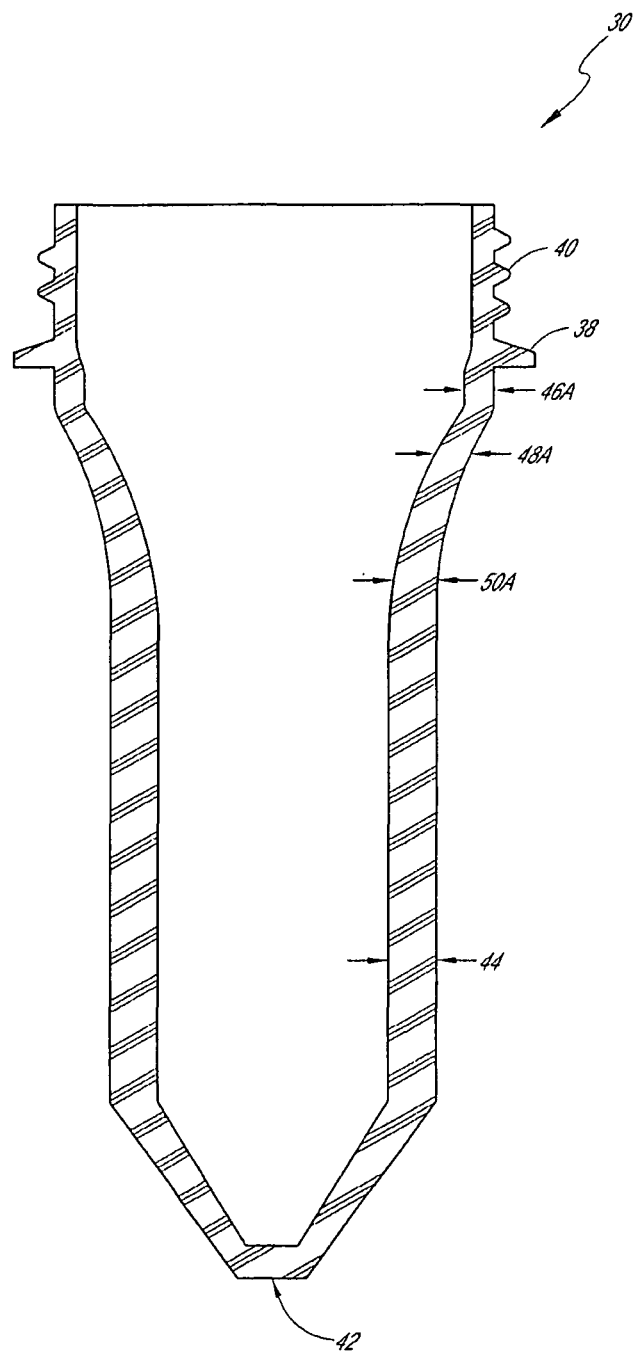
FIG. 2A is a cross section of a preform without an extended lightweight finish.

Referring to FIG. 2A, a cross-section of a preform 30 is depicted. The preform 30 has a neck portion 32 and a body portion 34, formed monolithically (i.e., as a single, or unitary, structure). Advantageously, the monolithic arrangement of the preform, when blow-molded into a bottle, provides greater dimensional stability and improved physical properties in comparison to a preform constructed of separate neck and body portions, which are bonded together.

The neck portion 32 begins at the opening 36 to the interior of the preform 30 and extends to and includes the support ring 38. The neck portion 32 is further characterized by the presence of a structure for engaging a closure. In the illustrated embodiment, the structure includes threads 40, which provide a means to fasten a cap to the bottle produced from the preform 30. The illustrated preform has a shorter overall neck area than most conventional preforms, which shorter neck area may also be thinner than in conventional preforms. The thickness of the neck area 52A is measured at the very top or between the threads or any other protruding structures. The body portion 34 is an elongated structure extending down from the neck portion 32 and culminating in the end cap 42. In some embodiments the body portion is generally cylindrical, and the end cap is conical or frusto-conical and may also be hemispherical, and the very terminus of the end cap may be flattened or rounded. The preform wall thickness 44 through most of the body portion will depend upon the overall size of the preform 30 and the wall thickness and overall size of the resulting container. The preform wall thickness between 48A and 50A is slightly thinner than the wall thickness throughout the straight portion of the body portion, both of which are thicker than at 46A immediately below the support ring 38. A slight taper often below 0.01 mm may also be found from 50A to 44 to help with release of the injected preform from the core during processing.

Figure 2B:
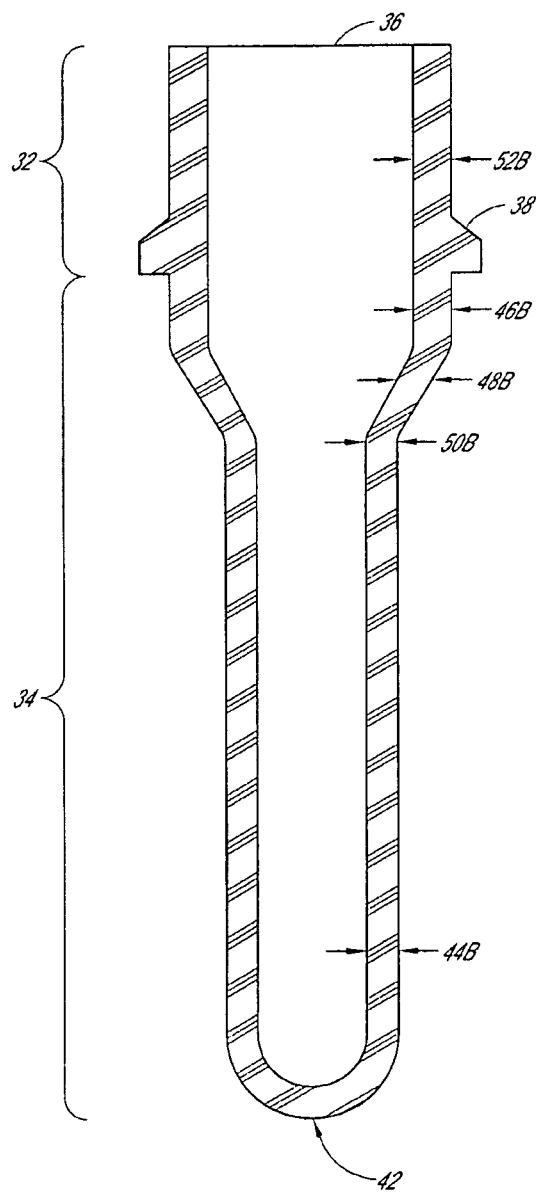
FIG. 2B is a cross section of another preform without an extended lightweight finish.

FIG. 2B illustrates a cross-section of another embodiment of a prior art preform. The preform has a neck portion and a body portion. The neck portion of the preform is of an axial length as may be found in conventional preforms. Although the thickness of the upper segment or portion of the body portion 46B is of a similar thickness as the neck portion 52B, it is also substantially similar thickness or the same thickness as the remainder of the body portion of the preform (e.g. 44B, 50B). In contrast to the preform in FIG. 2B, the preform in 2C is substantially thicker in the middle segment (e.g. 44C) of the body and in the end cap 42 than in the upper segment (e.g. 46C) of the body portion, which is of a similar thickness or same thickness as the neck portion 52C. In other embodiments, the upper segment of the body portion (e.g. 46C) may be thinner than the neck portion 52C.

Figures 5A, 5B:
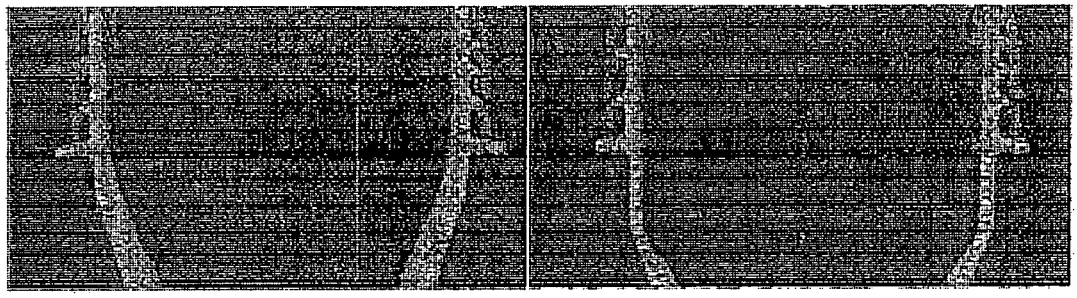
FIG. 5A is a micro-CT slice of the neck and upper body of a preform as in FIG. 2A.
FIG. 5B is a micro-CT slice of the neck and upper body of a preform such as in FIG. 2C.

In contrast to that illustrated in FIG. 2A, the preform illustrated in FIG. 2C has a reduced thickness in the upper portion of the body portion of the preform below the support ring 38, in that point 46C is substantially thinner than the corresponding location 46A in the prior art preform, 48C is of similar thickness to 46C which is much thinner than 48A of the prior art preform, and the thickness increases from point 48C to 50C, where it transitions into the straight portion of the preform having a thickness 44. Preforms and containers blown from such preforms having such a thinned area at the uppermost portion of the body portion are sometimes referred to herein as having an "extended finish". A further illustration of this difference, in accordance with one embodiment, can be seen in FIG. 5A and FIG. 5C. The preform illustrated in FIG. 2C also has a shorter overall neck area than most conventional preforms, wherein the shorter neck area may also be thinner than in conventional preforms.

As compared to the prior art preform in FIG. 2A, the thickness at 46C is about 20-50% of the thickness at 46A, the thickness at 48C is about 20-60% of the thickness at 48A, and the thickness at 50C is about 80-100% of the thickness at 50A. In one embodiment, the thicknesses of 46C and 48C differ by less than about 20%, including less than about 10%, or they are substantially the same thickness. As an example, for a preform used to form an 8 oz. bottle, the thickness at 46C is about 0.7 mm, the thickness at 48C is about 0.8, and the thickness at 50C is about 2 mm. By means of comparison, for the prior art preform used to form an 8 oz. bottle, the thickness at 46A is about 1.5 mm the thickness at 48A is about 2 mm, and the thickness at 50A is about 2.5 mm. As another example, for a preform used to form a 16.9 oz. bottle, the thickness at 46C is about 0.7 mm, the thickness at 48C is about 1 mm, and the thickness at 50C is about 2.4 mm, compared to about 1.2 at 46A, about 1.8 mm at 48A, and about 2.4 mm at 50A in a prior art preform. As another example, for a preform used to form a 33.8 oz. bottle, the thickness at 46C is about 0.75, the thickness at 48C is about 1 mm, and the thickness at 50C is about 2.6 mm, compared to about 1.5 at 46A, about 1.9 mm at 48A, and about 2.7 mm at 50A in a prior art preform. The total weight of a preform used to form an 8 oz bottle according to FIG. 2C is about 7 grams as compared to about 12.5 grams for a preform according to FIG. 2A. The total weight of a preform used to form a 16.9 oz bottle according to FIG. 2C is about 8.5 grams as compared to about 9.2 grams for a preform according to FIG. 2A. The total weight of a preform used to form a 33.8 oz bottle according to FIG. 2C is about 18.3 grains as compared to about 26 grams for a preform according to FIG. 2A. Using the information provided herein, one skilled in the art can prepare other sizes of preforms that have similar characteristics to those described herein. Also, the dimensions in other useful embodiments of preforms may vary from the above-stated dimensions by 0.1 mm, 0.2 mm, 0.3 mm, 0.4 mm, 0.5 mm, 0.6 mm, 0.7 mm, 0.8 mm, 0.9 mm or 1 mm.

In accordance with certain embodiments, the upper segment of the body portion of the preform, which is adjacent to the support ring, has a thickness that is substantially similar to the thickness 52C of the neck. In some such embodiments, the thicknesses of the upper segment and the neck may differ by +/−0 mm, 0.1 mm, 0.2 mm, 0.3 mm, or 0.4 mm. In some such embodiments, the thicknesses of the upper segment and the neck may differ by up to 10%, up to 20%, or up to 30%. Accordingly, the thickness of the upper segment of the body portion of the preform may be substantially the same thickness, or it may be either thicker or thinner than the neck 52C. In accordance with other embodiments, the thickness of the upper segment of the body portion of the preform is less than that of a middle or lower segment of the body portion. In some such embodiments, the wall thickness of the upper section is about 10% to about 40% of the thickness of the lower and/or middle section of the body, including about 15% to about 40%, about 15% to about 30%, about 25% to about 35%, about 20% to about 35%, about 20% to about 30%, including about 12%, about 13%, about 17%, about 19%, about 22%, about 24%, about 27%, about 29%, about 31%, and about 33%, including ranges bordered and including the foregoing values. In some such embodiments, the wall thickness of the upper segment of the body is about 0.3 mm to about 0.9 mm, including about 0.3 mm to about 0.5 mm, about 0.4 mm to about 0.7 mm, about 0.5 mm to about 0.9 mm, about 0.7 mm to about 0.8 mm, including about 0.35 mm, about 0.45 mm, about 0.55 mm, about 0.65 mm, about 0.75 mm, and about 0.85 mm, including ranges bordered and including the foregoing values. In accordance with other embodiments, the axial length of the upper segment measures about 20% or more, including about 25% or more of the axial length of the neck portion, including about 20% to about 30%, about 20% to about 35%, about 25% to about 30%, and about 25% to about 35% of the axial length of the neck portion. Preforms may include one or more or all of the features described above.

Figure 2C:
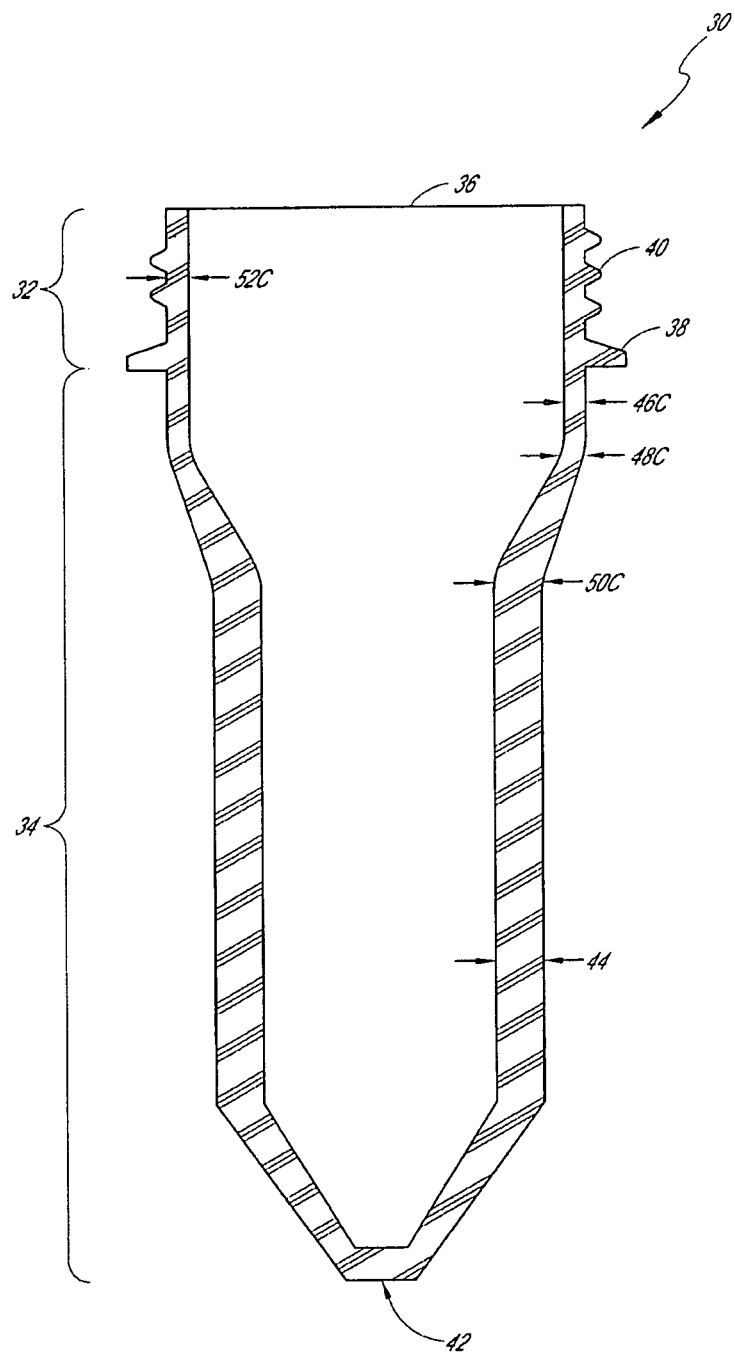
FIG. 2C is a cross section of a preform according to one embodiment disclosed herein.
Figure 3:
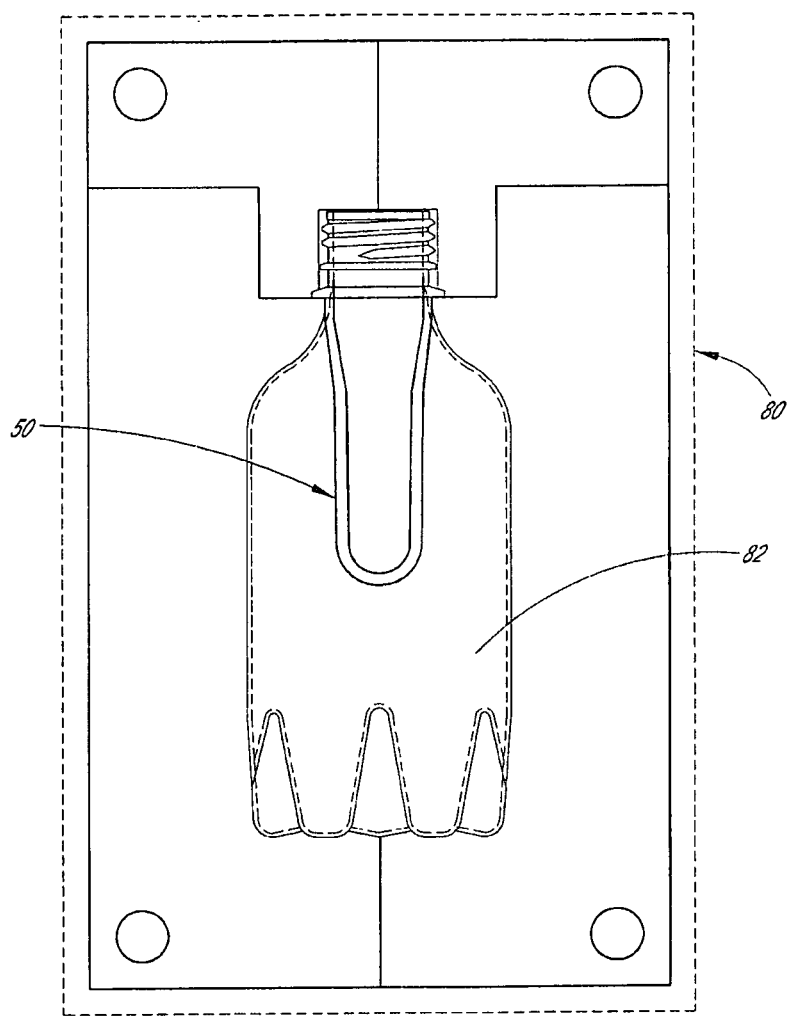
FIG. 3 is a cross-section of a preform in the cavity of a blow molding apparatus of the type that may be used to make a bottle or container.

After a preform, such as that depicted in FIG. 2A, 2B or 2C, is prepared by injection molding; it is subjected to a stretch blow-molding process. Referring to FIG. 3, in this process a preform 50 is placed in a mold 80 having a cavity corresponding to the desired container shape. The preform is then heated and expanded by stretching such as by a stretch rod inserted into the center of the preform to push it to the end of the mold and by air forced into the interior of the preform 50 to fill the cavity within the mold 80, creating a container 82. The blow molding operation normally is restricted to the body portion 34 of the preform with the neck portion 32, including the support ring, retaining the original configuration as in the preform.

When performing the stretch blow molding process to create the container, preforms are conventionally loaded onto a spindle which engages the inner wall of the neck portion of the preform and facilitates transporting the preform into and through the stretch blow molding machinery. Because of the extended neck finish in accordance with embodiments described herein, it may be beneficial to have the spindle extend into the inner wall of the preform into the region of the upper segment of the body portion, beyond the neck portion. In some embodiments, the spindle loads into the preform the full extent of the extended neck finish. This may be accomplished by adjusting the depth to which the spindle loads and/or by changing the spindle to have sufficient length to extend the greater distance. The extended spindle loading depth helps to maintain the dimensions of the extended neck finish, especially in those embodiments where the extended neck finish is relatively thin such that the dimensional stability of the lower part of the extended neck finish and/or the lower part of the upper segment of the body portion would otherwise be at risk due to exposure to heating elements and/or elevated temperatures in other portions of the body during the stretch blow molding process.

Figure 4:
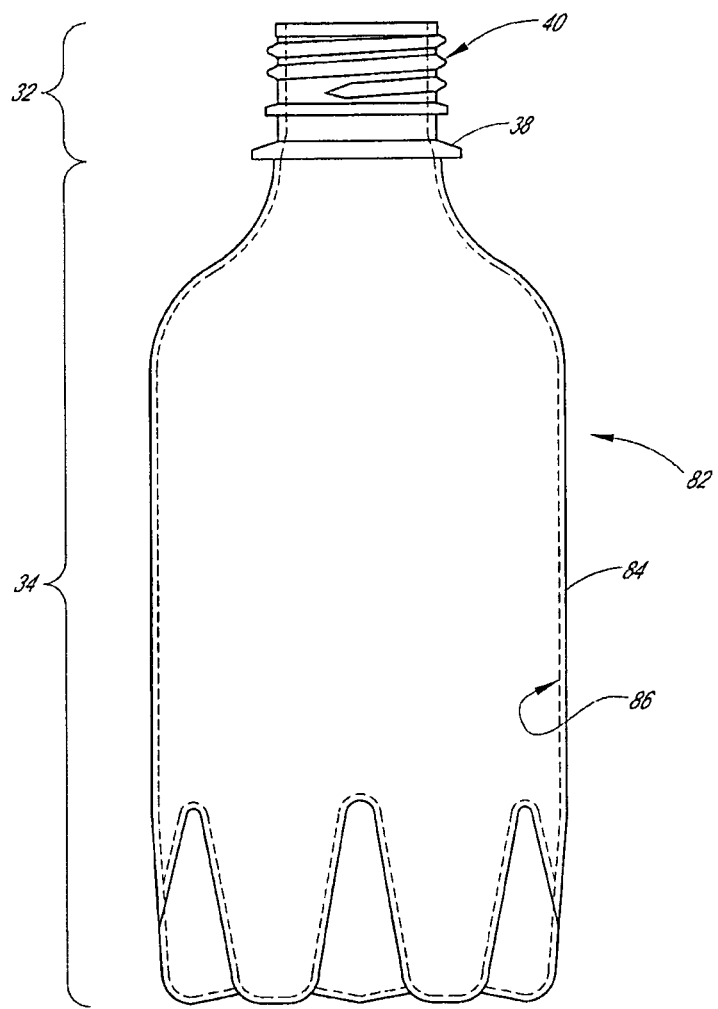
FIG. 4 is a bottle or container.

Referring to FIG. 4, there is disclosed an embodiment of container 82 in accordance with a preferred embodiment, such as that which might be made from blow molding the preform 50 of FIG. 2A, 2B or 2C. The container 82 has a neck portion 32 and a body portion 34 corresponding to the neck and body portions of the preform 50 of FIG. 3. The neck portion 32 is further characterized by the presence of the threads 40 or other closure engagement means that provides a way to fasten a cap onto the container.

In preforms having neck finishes that are lighter in weight and portions immediately below the finish (uppermost portion of the body), such as those described herein, the lighter weight portions are more susceptible to damage or softening from the heat supplied to the remainder of the preform during blow molding. Aggressive cooling of the finish was seen as a way to enable light weighting. Since not all machines cool identically or as effectively, it was observed that to properly blow the bottle, the finish would go through distortion. A short term solution to prevent distorting the finish was to limit heating of the preform below the support ledge. This left plastic from the preform in the neck of the bottle. This is referred to a "ring" in the neck. While unattractive and inefficient from a resin use perspective, such a decision allowed the light weight preform to continue to produce acceptable bottles.

Thus, a concept was conceived where the material normally placed in the preform to be stretched from directly below the support ledge was removed and replaced with a wall thickness at the desired dimensions of the finished product. The distance of this bottle "neck" was set by the bottle design, but the new extended finish concept allows for some heating and stretching. By definition the design change also provides for a transition from fully blown bottle to rigidly retained threads across this zone. An extended finish is especially useful in smaller finishes that are substantially shorter from the support ring to the top of the finish as compared to prior finishes that have considerable distance (up to 10 mm) from the threads to the base of the support ledge/ring. Such shorter finishes may also be thinner. This new design was also discouraged because having a thin area upstream of a thicker threaded area in an injection mold would be difficult, if not impossible, to mold properly since it would likely prevent resin from completely filling the neck finish under usual injection pressures. Thus injection limitations have historically limited this approach rather than mechanical performance. Accordingly, in some embodiments, during the injection molding process, the closing of the neck ring can be slightly delayed to allow filling of the small spaces before clamping it down to mold at least the neck and finish. Minimal experimentation is needed to determine the correct timing and amount of polymer melt to ensure complete filling of the neck and finish while minimizing flashing.

In addition to providing lighter weight preforms and bottles, the extended finish preforms disclosed herein, which may incorporate other lightweighting features described herein such as a shorter and/or thinner neck and/or thinner walls in the body portion, can also have the advantage of being produced using a lower cycle time in molding. Lower cycle time increases the number of preforms that can be made by a single piece of equipment in a day and can lower the total energy needed to produce a single preform, resulting in additional cost savings to the manufacturer.

It was also generally thought that a thicker support ledge and larger amounts of plastic near that region (above in the finish and below at the uppermost portion of the body) was needed to absorb heat and prevent it from transferring into the finish. This has also been shown by the present applicant to be incorrect. It has been found that the thick ring of plastic provides heat storage and serves as a heat source during later bottle handling and processing steps. Thinning the region below the support ledge, under this new perspective, provides resistance to heat travelling up to the finish in that this area can rapidly cool so that it is not a latent heat source during later operations. Since, in certain embodiments, this region does not need to be stretched during blow molding, it does not need to be heated and the blow-molding procedure and apparatus may be adjusted such that the uppermost portion or upper segment of the preform/container body (in the area of the extended finish) is not heated, or heated very little as compared to the bulk of the body of the preform, as part the blow molding process. This change is easy to accommodate in modern equipment and makes the production process easier and more stable. For example, the position of the cooling rail or shims may be adjusted to provide greater protection from heat for the extended finish, the intensity of the heating element(s) may be adjusted, and/or the position of the heating element(s) may be adjusted. It should be noted that preforms having an extended finish may be blow molded in conventional processes that actively heat the lower portion of the extended finish (i.e. the uppermost portion of the body), but such processes are generally less effective in creating consistently stable bottles during production.

Figure 6:
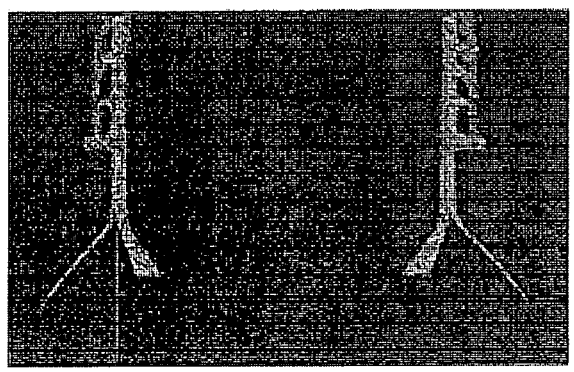
FIG. 6 is a superimposition of micro-CT slices of a preform as in FIG. 5B and a bottle blown therefrom.

The applicant has discovered that when the preform of FIG. 2A is blown to form a bottle in a process that protects the extended finish from heating during blow molding as described above, the thickness at 46A and 48A changes very little, with essentially all of the wall portion of the bottle being formed from the stretching of the wall around 50A and below. This is shown in FIG. 6 which presents a superimposition of cross sections of a preform having an extended finish and a bottle blown therefrom. Accordingly, the wall thickness at the lower segment of the neck portion of the preform, including at 46C and 48C, is lessened as described hereinabove to reduce the amount of material needed to form the preform while still maintaining the necessary degree of structural integrity to allow for ease in blow molding to form a container that has sufficient mechanical strength to withstand the forces exerted on it during formation, filling, transportation and use.

In accordance with some embodiments herein, the width of the support ring/ledge is increased as compared to that in a standard shorter finish. Given that a 0.6 mm width to the support ledge (as in a standard shorter finish) provides forces upon a finger that are considered to be within the pain threshold for a finger, increasing the width will provide greater comfort for the consumer. Accordingly a width of at least about 1 mm, 1.2 mm, 1.4 mm, 1.6 mm, 1.8 mm, 2 mm, 2.2 mm, 2.4 mm, 2.6 mm or greater would provide greater comfort to the consumer when opening the closure. Alternatively or concomitantly, changes may be made to the cap including by increasing the apparent cap diameter such as by providing ribs on the tamper ring that are of greater height than the remaining cap. Other reasons to widen the ledge include conveyor handling, heat sink properties of the ledge, better feel when opening the container, greater resistance to damage during processing and transport. It should be noted that increasing the width of the support ledge is counter to lightweighting, such that it should be balanced with other considerations when designing a preform and container.

In other embodiments in which it is desired for the container to be heat-set, it is preferred that the containers be blow-molded in accordance with processes generally known for heat set blow-molding, including, but not limited to, those which involve orienting and heating in the mold, and those which involve steps of blowing, relaxing and reblowing. The mold 80 can quickly cool the container during this process, especially with high heat transfer material absorbing heat from the container at a high rate.

In some embodiments, the blow mold can be used to produce crystalline neck finishes. For example, the neck portion of the blow mold and the body portion of the blow mold can selectively control the temperature of the preform/container to achieve a desired amount of crystallization. Thus, the neck portion of the preform/container can be heated and gradually reduced in temperature to produce a desired amount of crystalline material.

In some embodiments for preforms in which the neck finish is formed primarily of PET, the preform is heated to a temperature of preferably 80° C. to 120° C., with higher temperatures being preferred for the heat-set embodiments, and given a brief period of time to equilibrate. After equilibration, it is stretched to a length approximating the length of the final container. Following the stretching, pressurized air, such as chilled food grade air, is forced into the preform which acts to expand the walls of the preform to fit the mold in which it rests, thus creating the container. Fluid is circulated through the mold and rapidly cools the container contacting the interior surface. The temperature of the chilled air for stretching the preform and the temperature of the fluid cooling the mold can be selected based on the desired container finish, production time, and the like.

The articles described herein may be made from any suitable thermoplastic material, such as polyesters including polyethylene terephthalate (PET), polyolefins, including polypropylene and polyethylene, polycarbonate, polyamides, including nylons (e.g. Nylon 6, Nylon 66, MXD6), polystyrenes, epoxies, acrylics, copolymers, blends, grafted polymers, and/or modified polymers (monomers or portion thereof having another group as a side group, e.g. olefin-modified polyesters). These materials may be used alone or in conjunction with each other. More specific material examples include, but are not limited to, ethylene vinyl alcohol copolymer ("EVOH"), ethylene vinyl acetate ("EVA"), ethylene acrylic acid ("EAA"), linear low density polyethylene ("LLDPE"), polyethylene 2,6- and 1,5-naphthalate (PEN), polyethylene terephthalate glycol (PETG), poly(cyclohexylenedimethylene terephthalate), polystryrene, cycloolefin, copolymer, poly-4-methylpentene-1, poly(methyl methacrylate), acrylonitrile, polyvinyl chloride, polyvinylidine chloride, styrene acrylonitrile, acrylonitrile-butadiene-styrene, polyacetal, polybutylene terephthalate, ionomer, polysulfone, polytetra-fluoroethylene, polytetramethylene 1,2-dioxybenzoate and copolymers of ethylene terephthalate and ethylene isophthalate. In certain embodiments preferred materials may be virgin, pre-consumer, post-consumer, regrind, recycled, and/or combinations thereof.

In some embodiments polypropylene also refers to clarified polypropylene. As used herein, the term "clarified polypropylene" is a broad term and is used in accordance with its ordinary meaning and may include, without limitation, a polypropylene that includes nucleation inhibitors and/or clarifying additives. Clarified polypropylene is a generally transparent material as compared to the homopolymer or block copolymer of polypropylene. The inclusion of nucleation inhibitors helps prevent and/or reduce crystallinity, which contributes to the haziness of polypropylene, within the polypropylene. Clarified polypropylene may be purchased from various sources such as Dow Chemical Co. Alternatively, nucleation inhibitors may be added to polypropylene.

As used herein, "PET" includes, but is not limited to, modified PET as well as PET blended with other materials. One example of a modified PET is IPA-modified PET, which refers to PET in which the IPA content is preferably more than about 2% by weight, including about 2-10% IPA by weight, also including about 5-10% IPA by weight. In another modified PET, an additional comonomer, cylohexane dimethanol (CHDM) is added in significant amounts (e.g. approximately 40% by weight or more) to the PET mixture during manufacture of the resin.

Additives may be included in articles herein to provide functional properties to the resulting containers. Such additives include those providing enhanced gas barrier, UV protection, scuff resistance, impact resistance and/or chemical resistance. Preferred additives may be prepared by methods known to those of skill in the art. For example, the additives may be mixed directly with a particular material, or they may be dissolved/dispersed separately and then added to a particular material. Additives are preferably present in an amount up to about 40% of the material, also including up to about 30%, 20%, 10%, 5%, 2% and 0.1% by weight of the material. In other embodiments, additives are preferably present in an amount less than or equal to 1% by weight, preferred ranges of materials include, but are not limited to, about 0.01% to about 1%, about 0.01% to about 0.1%, and about 0.1% to about 1% by weight.

Another possible additive is microparticulate clay or graphene based materials. These materials comprise tiny, micron or sub-micron size (diameter), particles of materials which enhance the barrier and/or mechanical properties of a material by creating a more tortuous path for migrating gas molecules, e.g. oxygen or carbon dioxide, to take as they permeate a material and/or providing added stiffness. In preferred embodiments nanoparticulate material is present in amounts ranging from 0.05 to 1% by weight, including 0.1%, 0.5% by weight and ranges encompassing these amounts. One preferred microparticulate clay based product is Cloisite® available from Southern Clay Products. In certain embodiments preferred nanoparticles comprise montmorillonite that may be modified with a ternary or quaternary ammonium salt. In further embodiments, such particles comprise organoclays as described in U.S. Pat. No. 5,780,376, the entire disclosure of which is hereby incorporated by reference and forms part of the disclosure of this application. Other suitable organic and inorganic microparticulate clay based or nano-sized products may also be used. Both man-made and natural products are also suitable.

In some embodiments, the UV protection properties of the material may be enhanced by the addition of one or more additives. In a preferred embodiment, the UV protection material used provides UV protection up to about 350 nm or less, preferably about 370 nm or less, more preferably about 400 nm or less. The UV protection material may be used as an additive with layers providing additional functionality or applied separately as a single layer. Preferably additives providing enhanced UV protection are present in the material from about 0.05 to 20% by weight, but also including about 0.1%, 0.5%, 1%, 2%, 3%, 5%, 10%, and 15% by weight, and ranges encompassing these amounts. Preferably the UV protection material is added in a form that is compatible with the other materials. In some embodiments, a preferred UV protection material comprises a polymer grafted or modified with a UV absorber that is added as a concentrate. Other preferred UV protection materials include, but are not limited to, benzotriazoles, phenothiazines, and azaphenothiazines. UV protection materials may be added during the melt phase process prior to use, e.g. prior to injection molding or extrusion. Suitable UV protection materials are available from Milliken, Ciba and Clariant.

Although the present invention has been described herein in terms of certain preferred embodiments, and certain exemplary methods, it is to be understood that the scope of the invention is not to be limited thereby. Instead, Applicant intends that variations on the methods and materials disclosed herein which are apparent to those of skill in the art will fall within the scope of Applicant's invention.

What is claimed is:

1. A plastic preform formed monolithically, suitable for forming a bottle, the preform comprising:
    a neck portion adapted to engage a closure and including a plurality of threads, the neck portion having a neck wall thickness and a neck inner diameter; and
    an elongated body portion including a cylindrical wall portion and an end cap, wherein
        a first upper segment of the elongated body portion has an inner diameter equal to the neck inner diameter and a wall thickness equal to the neck wall thickness,
        a second upper segment of the body portion disposed adjacently below the first upper segment extends farther along the elongated body than the first upper segment, and
        a third segment of the body portion disposed adjacently below the second upper segment of the body portion has a wall thickness greater than the neck wall thickness and an inner diameter smaller than the neck inner diameter, and
    wherein the first upper segment wall thickness is about 0.2 mm to about 0.9 mm.

2. The plastic preform of claim 1, wherein a portion of the first upper segment wall thickness is about 10% to about 40% of the wall thickness of the third segment.

3. The plastic preform of claim 1, wherein a portion of the first upper segment wall thickness is about 25% to about 30% of the wall thickness of the third segment.

4. The plastic preform of claim 1, wherein a portion of the first upper segment wall thickness is about 0.7 mm to about 0.8 mm.

5. The plastic preform of claim 1, wherein an axial length of the first upper segment is about 25% or more of an axial length of the neck portion.

6. The plastic preform of claim 1, wherein an axial length of the first upper segment is about 25% to about 35% of an axial length of the neck portion.

7. A bottle or container made from a preform according to claim 1.

* * * * *